Dec. 3, 1929.  W. B. SMITS  1,738,456

RESISTANCE ELEMENT

Filed June 30, 1928

Inventor:
Wytze Beije Smits.
By Langner, Parry, Card & Langner
Attys

Patented Dec. 3, 1929

1,738,456

UNITED STATES PATENT OFFICE

WYTZE BEIJE SMITS, OF KASSEL-WILHELMSHOHE, GERMANY

RESISTANCE ELEMENT

Application filed June 30, 1928, Serial No. 289,477, and in Czechoslovakia February 23, 1928.

It is known, that in electrical heating apparatuses the heat resistances are pressed or cast in a mass of chamotte or metal to make these resistances air-tight and acid-tight. The casting of a mantle of metal has proved to be more advantageous as compared with the pressing in chamotte. The wound wires however must be insulated, because otherwise the electric circuit might be shorted due to contact of the wires with the metal body. The thinner the insulation layer, the greater is the efficiency of the resistance unit, and the firmer this layer of insulation is enclosed by the layer of metal, the better the transfer of heat that is obtained.

Because however the winding together with the insulation is in most cases applied on cores such as metal pipes or on plates, these metal pipes or plates, which are cast or pressed, a mass of metal, must afterwards be closed up air-tight and acid-tight. In order to obtain this air-tight and acid-tight closure, a pipe 2 having both of its ends flared at an angle of approximately 45° is used.

In case the pipe material has a coefficient of expansion different from that of the mass of metal, the tightening or sealing will be exactly the same as when the material of the mass of metal would have the same coefficient of expansion as the pipe-metal and this is due to the fact that the ends of the pipes are widened or flared at an angle of about 45°.

Figure 1:
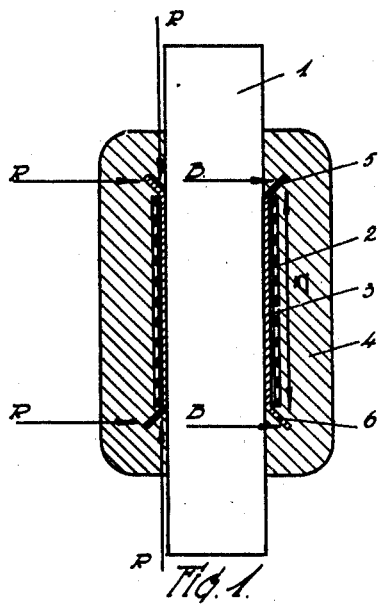
Fig. 1 is a view illustrating one embodiment of the invention.

In Fig. 1 the numeral 1 indicates the copper terminal, which goes through the pipe 2. The pipe 2 serves as a support for the resistance-wires 3. The whole is enclosed by a mass of metal 4 cast thereon. After the pipe 2 has been enclosed by the mass of metal 4, which has a coefficient of expansion different from that of the pipe 2, the following shrinking-process results.

On the surfaces 5 and 6 of the ends of the pipe which ends, through widening, are flared to project beyond the circumference of the pipe, the metal, after the casting step, has become connected with the enlarged ends of the pipe and the direction of the shrinking pressure is indicated by the reference letter R. When the resistance unit, thus produced, is now installed in the electric circuit and the circuit is closed, current flows through the winding 3, which becomes heated to a comparatively high degree. Thereupon the heat of the winding 3 is transferred to the pipe 2 and the mass of metal 4.

In the event the metal expands to the same degree as the pipe 2, the shrinking-pressure resulting from the casing operation, continues to exist and the unit remains closed or sealed.

In the event the pipe expands to a less degree than the cast covering or enclosing material, the mass of metal will creep or shift in the direction of the arrows B, so that the secure sealing of the covering remains exactly the same as before.

In the event the pipe expands to a degree greater than the cast covering or enclosing material, the pipe receives a counter-pressure in the direction of the arrows R, so that the secure sealing of the covering remains exactly the same as before.

Through this method of assembling and sealing the parts, of the unit, therefore, an air-tight and acid-proof sealing of the unit is obtained, whereby the resistance-wires situated in the interior are fully protected.

Figure 2:
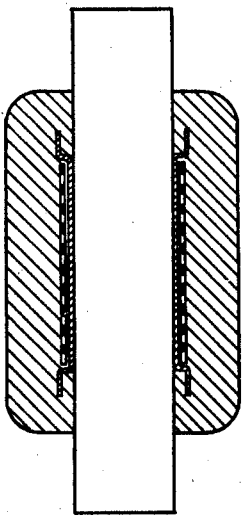
Fig. 2 is a view illustrating another embodiment of the invention.

The same result is obtained by the arrangement shown in Fig. 2, in which form of the invention, the enlarged ends of the pipe, instead of being flared at an angle of 45° are, by a further bending formed to extend at a right angle.

Claims:

1. An electrical heat resistance unit comprising insulated resistance wires, a metal core about which said wires are wound, and a metallic enclosure cast about the core and resistance wires, the ends of the core being outwardly directed whereby a seal will be maintained between the parts upon expansion or contraction of the core and enclosure.

2. An electrical heat resistance unit comprising insulated resistance wires, a metal core about which said wires are wound, and a metallic enclosure cast about the core and resistance wires, the core having conically flared ends.

3. An electrical heat resistance unit comprising insulated resistance wires, a tubular metal core about which said wires are wound, and a metallic enclosure cast about the core and resistance wires, the ends of the tubular core being overturned outwardly, substantially at right angles.

In testimony whereof I have signed my name to this specification.

WYTZE BEYE SMITS.